INVENTOR.
OLIVER K. KELLEY
BY
Craig V. Montour
ATTORNEY

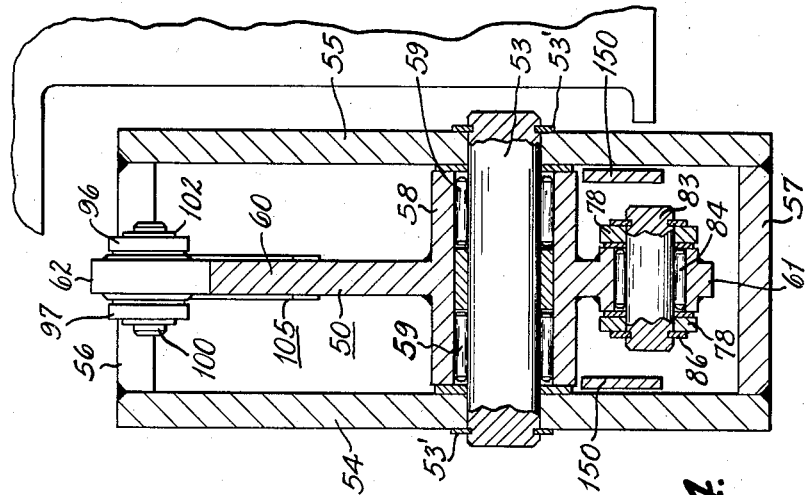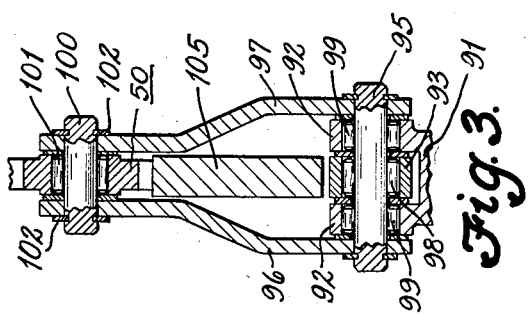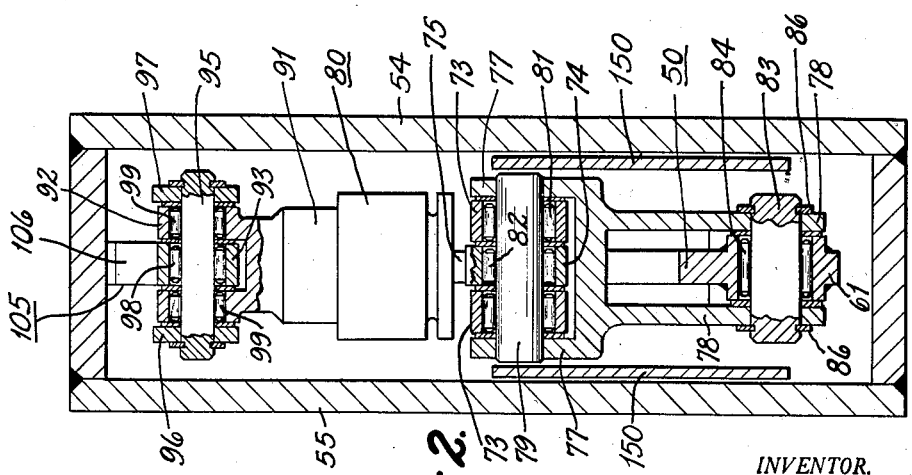

United States Patent Office 2,846,031
Patented Aug. 5, 1958

2,846,031

CONTROL LINKAGE FOR BRAKE MECHANISM

Oliver K. Kelley, Bloomfield Hills, Mich., assignor to General Motors Corporation, Detroit, Mich., a corporation of Delaware Application August 26, 1955, Serial No. 530,852

16 Claims. (Cl. 188—152)

This invention relates to actuating mechanisms for effecting operation of hydraulic brakes of a motor vehicle.

An object of the invention is to provide a pedal operated variable-ratio mechanical linkage to actuate the displacement piston of a hydraulic master cylinder, which pedal actuated linkage is supplemented with power actuation sufficient to remove harshness of pedal operation but with the variable-ratio linkage providing the control factor for regulating the power operation of the linkage so that the power operation will be a supplement to the mechanical linkage operation of the piston of the master cylinder.

Another object of the invention is to provide a brake actuating mechanism in accordance with the foregoing object wherein the pedal operated brake actuating linkage includes a control valve mechanism that is actuated concurrently with operation of the pedal actuated linkage system to control operation of a differential fluid pressure motor in response to movements of the pedal actuated linkage.

It is another object of the invention to provide brake actuating mechanism in accordance with the foregoing objects wherein the differential fluid pressure motor is rendered substantially fully effective during the initial movement of the pedal operated variable-ratio linkage so as to effect a take-up of the normal slack in the brake system of the motor vehicle by power actuation of the master cylinder during the initial brake pedal movement occurring at a time when the variable-ratio linkage is at its lowest mechanical advantage, but wherein the power actuation of the piston of the master cylinder is reduced in effectiveness after the slack is taken up in the brake system during that period of operation of the mechanical linkage wherein it increases its mechanical advantage.

Another object of the invention is to provide a brake actuating mechanism for operating the piston of a hydraulic master cylinder wherein there is provided a primary actuating variable-ratio linkage in the form of a toggle linkage connected between the pedal operated lever of the mechanism and the piston of the master cylinder to effect operation of the master cylinder as the linkage is moved from a position in which the links are arranged angular to one another toward a straight line position with the movement of the primary actuating linkage being controlled and regulated by a secondary control variable-ratio linkage in the form of a toggle linkage that is actuated by the pedal operated lever of the actuating system, the secondary control linkage having incorporated therein a control valve mechanism to regulate power operation of a differential fluid pressure motor that is also connected with the piston of the master cylinder to provide a power supplement to the mechanical actuating linkage, the power supplement having its greatest effectiveness during initial brake pedal movement to take up slack in the brake system and overcome resistance to movement inherent in the brake system and actuating linkage.

It is another object of the invention to provide a brake actuating mechanism in accordance with the foregoing objects wherein the differential fluid pressure motor includes a resiliently acting mechanism, such as a spring means, which establishes a relatively constant pressure loading on the piston of the master cylinder for actuation thereof irrespective of varying pressure differential on the motor effecting operation of the motor.

Further objects and advantages of the present invention will be apparent from the following description, reference being had to the accompanying drawings wherein a preferred form of the invention is clearly shown.

In the drawings:

Figure 2 is a cross sectional view taken along line 2—2 of Figure 1.

Figure 3 is a cross sectional view taken along line 3—3 of Figure 1.

Figure 4 is a cross sectional view taken along line 4—4 of Figure 1.

Figure 1:
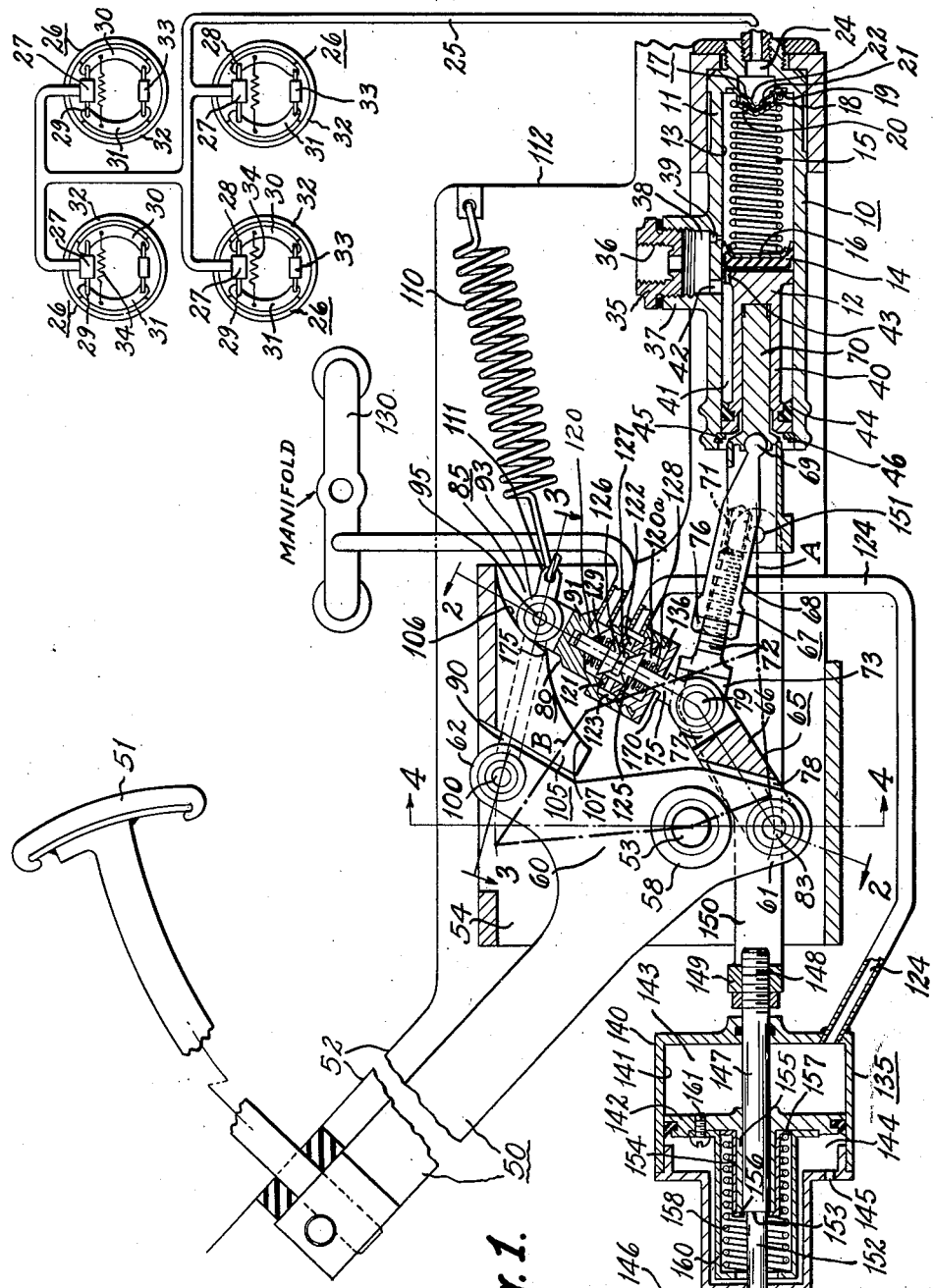
Figure 1 is a side view of an actuating mechanism for a brake system some parts of which are illustrated in cross section for clarity of illustration.

In this invention the brake actuating mechanism includes a master cylinder 10 having a cylinder body 11 that contains a piston 12 reciprocable in the cylinder bore 13. The piston 12 carries a rubber cup member 14 on the forward face of the piston, the cup member 14 being retained in position on the piston 12 by means of a compression spring 15 that extends between a metal cup 16 on the forward face of the cup 14 and a residual pressure valve 17 provided at one end of the cylinder bore 13.

The residual check valve 17 includes a valve member 18 seating upon the valve seat 19 as retained thereon by the spring 15. The valve member 18 has a plurality of ports 20 closed by a flexible rubber valve 21, the valve 21 being retained in the valve element 18 by means of the spider retainer 22. Hydraulic fluid under pressure is displaced from the cylinder bore 13 through the ports 20 and into the discharge line 24 for delivery into the hydraulic line conduit 25 that connects with the brakes 26 on a motor vehicle. When fluid is returned from the brakes 26 the valve element 18 lifts from the seat 19 against the action of the spring 15.

Each of the brakes 26 is provided with a conventional wheel cylinder 27 that receives fluid under pressure from the master cylinder 10. The wheel cylinder 27 has the conventional pistons within the cylinder that actuate the plungers 28 and 29 that connect with the brake shoes 30 and 31 to cause them to move into engagement with the brake drum 32. The opposite ends of the brake shoes 30 are connected by an adjusting member 33. A retraction spring 34 causes the brake shoes to move out of engagement with the brake drum.

The master cylinder 10 has a fitting 35 provided with a port 36 that connects with a fluid reservoir for the master cylinder, the fitting 35 being disposed within a boss 37 on the master cylinder 10 having the chamber 38 therein that receives fluid from the reservoir. When the master cylinder piston 12 is in the retracted position shown in Fig. 1 a port 39 is open just in advance of the forward lip of the rubber cup member 14, the port 39 being closed by the cup member 14 upon its initial advance toward the residual pressure valve 17.

The piston 12 has a small diameter portion 40 forming a chamber 41 with the bore of the cylinder 11 that communicates with the reservoir connected chamber 38 through a port 42 so that when the piston moves in a leftward direction from the residual check valve 17 fluid may enter the cylinder bore 13 around the outer periphery of the rubber cup 14 through the port 43 in the piston 12. The piston 12 also carries a rubber seal member 44. When the piston 12 is in the retracted position shown in Figure 1 it engages a stop washer 45 that is held in place in the cylinder body 11 by means of the snap ring 46.

The master cylinder piston 12 is operated by a manually actuated pedal lever 50 having a brake pedal 51 on one end thereof and extends through the floor wall 52 of a motor vehicle. The pedal lever 50 is pivotally mounted on a pivot pin 53 that is carried between the spaced mounting plates 54 and 55 that are retained in their spaced relationship by means of the transverse wall members 56 and 57. The pivot pin 53 is retained in position between the mounting plates by means of snap rings 53' at each end of the pin 53. The pedal lever 50 has a sleeve 58 around the pivot pin 53 so as to receive needle bearings 59 that support the sleeve and pedal lever on the pivot pin 53.

The pedal lever 50 is a double crank or T lever having the head 60 provided with the two ends 61 and 62.

The end 61 of the head of the T lever 50 is connected with the master cylinder piston 12 by means of a primary actuating variable-ratio linkage in the form of a toggle linkage 65 that consists of the link members 66 and 67.

The link member 67 consists of a sleeve 68 having a ball end 69 that fits within a corresponding recess in the member 70 secured to the master cylinder piston 12. The sleeve member 68 has a threaded bore 71 that receives a threaded stem 72 having a fork 73 at one end thereof that straddles a journal member 74 provided on the end of a valve plunger 75 that enters and operates a control valve mechanism 80 provided in a secondary control variable-ratio linkage in the form of a toggle linkage 85 hereinafter more fully described. A jam nut 76 is provided on the threaded stem 72 to lock the stem relative to the sleeve 68.

The link 66 of the primary actuating linkage 65 has a fork 77 on one end thereof that straddles the fork 73 of the link 67, as shown in Figure 2. The opposite end of the link 66 has a fork 78 that straddles the end 61 of the head 60 of the pedal lever 50.

A pivot pin 79 extends between opposite sides of the fork 77 and through the fork 73 and the journal 74, the fork 73 and the journal 74 being supported on the pin 79 by needle bearings 81 and 82. Similarly the end 61 of the T lever head 60 is supported on a pin 83 on needle bearings 84, the pin 83 being held in position in the fork 78 by means of snap rings 86.

The secondary control linkage 85 that includes the control valve mechanism 80 and a link 90 extends between the end 62 of the head 60 of the pedal lever 50 and the knee pivot pin 79 of the primary actuating linkage 65 to effect movement of the primary linkage from the angular position illustrated in full lines to a substantially straight line position illustrated by the dot-dash lines A representing the centers of the linkage and pivots of the same thereby increasing the mechanical advantage of the linkage from minimum to maximum.

The control valve mechanism 80 has one end thereof connected with the knee 79 of the primary actuating linkage 65 by means of the plunger 75 as heretofore described, see Figure 1. The plunger 75 enters a valve body 91 that has a fork 92 on the end thereof that straddles a roller 93 carried upon a knee pivot pin 95 extending through the fork 92 into engagement with the members 96 and 97 on opposite sides of the fork 92 that form the link 90. The roller 93 and the fork 92 are provided with needle bearings 98 and 99.

The opposite end of the members 96 and 97 of the link 90 extend on opposite sides of the end 62 of the head 60 of the pedal lever 50 being connected therewith by means of the pivot pin 100. Needle bearings 101 are placed between the end 62 and the pivot pin 100. Snap rings 102 retain the pin 100 in place.

The secondary control linkage 85 has the knee roller 93 engaging a cam 105 that has one cam surface 106 and a second different cam surface 107 so that when the pedal lever 50 is moved in a counter-clockwise direction about its pivot 53 the knee pivot 95 will follow the cam surfaces 106 and 107 to cause the links 90 and 80 of the secondary control linkage to move from the angular relationship shown in Fig. 1 toward a straight line relation illustrated by the dot-dash line B whereby the primary actuating linkage is moved from its angular relationship toward the straight line position A thereof.

A retraction spring 110 extends between a lug 111 at the knee pivot 95 and the frame 112 of the motor vehicle normally to retain the toggle linkage system and the master cylinder piston in the position shown in Figure 1.

The two cam surfaces 106 and 107 provide for different rates of movement of the link 80 of the secondary control linkage in a manner hereinafter described.

The control valve mechanism 80, forming one link of the secondary control linkage 85 consists of the valve body 91 having a chamber 120. A valve seat ring 121 is disposed substantially mid-way between opposite ends of the chamber 120 and has a plurality of ports 122 connecting the internal bore of the valve ring 121 with an annular chamber 123 from which there extends a fluid line 124 that connects with a differential fluid pressure motor 135.

The plunger 75 slidably carries a pair of valve members 125 and 126 separated by a collar 127 secured to the plunger 75. The valve 125 is spring urged upon the seat ring 121 by a spring 128 and the valve 126 is similarly urged against the opposite side of the seat ring 121 by a spring 129.

The chamber 120 adjacent the valve 126 is connected to the manifold 130 of a vehicle engine whereby to provide a source of vacuum into the chamber 120 adjacent the valve 126 that is normally closed, as shown in Fig. 1 when the brakes are in a retracted or relaxed position. The chamber 120a adjacent the valve member 125 is provided with an exhaust port 136 to exhaust the chamber to atmosphere. Normally the valve 125 is seated upon the seat ring 121 as shown in Fig. 1.

The differential fluid pressure motor 135 comprises a cylinder body 140 having a cylinder bore 141 in which the piston 142 is reciprocable. The piston 142 divides the cylinder bore 141 into a vacuum receiving chamber 143 and an atmospheric pressure chamber 144. The vacuum chamber 143 is connected with the follow-up valve mechanism 80 by means of the conduit 124. The atmospheric pressure chamber 144 is continuously open to atmosphere through the port 145. The cylinder body 140 is secured to the vehicle frame element 146 so that the differential fluid pressure motor 135 is stationary.

The piston 142 of the motor 135 is slidably disposed on a rod member 147 that has a threaded end portion 148 received within a connecting member 149 that connects the rod 147 with the master cylinder piston 12 by means of the extension 150 on the piston 12 that in turn is connected with the connecting member 149 by means of pivot pins 151. The connecting member 149 has a pair of arms that extend parallel on opposite sides of the primary actuating linkage 65 between the rod 147 and the extension 150 of the master cylinder piston 12.

The rod 147 has a reduced diameter portion 152 that forms a shoulder 153. A cylindrical sleeve 154 surrounds a hub extension 155 of the piston 142 and has an inwardly turned radial flange 156 that engages the end of the hub extension 155 and the shoulder 153 on the rod 147. The sleeve 154 is slidable on the hub extension 155. The opposite end of the sleeve 154 has an outwardly turned radial flange 157 that receives one end of a resilient compression spring 158 that has the opposite end engaging the inwardly turned radial flange of a sleeve 160 that is secured to the piston 142 by means of screws 161. The spring 158 provides for a predetermined pressure loading on the rod 147 for reasons and in a manner hereinafter described.

In operation, with the engine of the vehicle operating there will be a vacuum source established in the manifold 130 of the engine that is continuously supplied to the chamber 120 adjacent the valve 126 of the control valve mechanism 80. When the brakes 26 are applied the brake pedal 51 is moved downwardly causing counter-clockwise rotation of the pedal lever 50 about its pivot pin 53. This action causes the end 62 of the T lever 50 to move in a left hand direction while the end 61 thereof moves in a right hand direction. With the end 62 moving in a left hand direction, that is counter-clockwise, the knee roller 93 moves downwardly on the cam surface 106 whereby to cause the valve body 91 to engage the shoulder 170 on the plunger 75 to cause the knee pivot 79 of the primary actuating linkage to move downwardly. This action mechanically effects movement of the master cylinder piston 12 through the actuating linkage 65 since it is moving from the angular position illustrated to its straight line position A concurrently with movement of the pivot pin 83 in a right hand direction.

Concurrently with this mechanical movement of the actuating linkage 65 under control of the secondary control linkage 85, the movement of the valve body 91 toward engagement with the shoulder 170 causes the plunger 75 to move collar 127 to thus move the valve member 126 away from the valve seat ring 121 to allow vacuum in the manifold to pass from the chamber in which the valve 126 operates into the seat ring 121 and through the ports 122 into the conduit 124 and thus to the vacuum chamber 143 of the differential fluid pressure motor 135. Since atmospheric pressures stand continuously in the atmospheric chamber 144 of the motor 135, the piston 142 will be moved in a right hand direction, see Figure 1. Power movement of the piston 142 by atmospheric pressure in the chamber 144 will supplement the mechanical actuation of the master cylinder piston 12. At this time the mechanical linkage is at its lowest mechanical advantage since the actuating linkage 65 is in its full angular position. Thus at this time the cam surface 106 causes sufficiently rapid movement of the control valve mechanism to retain the valve 126 in a substantially full open position to provide substantially full vacuum power to the motor 135 so that it will quickly take up all slack in the actuating mechanism of the brakes 26 and bring the brake shoes into engagement with the brake drum. This action of the motor 135 overcomes the resistance to movement of the brake mechanisms and overcomes the action of the return spring 110 so that there is a relatively soft pedal movement during this initial portion of the stroke of the brake pedal 51. When movement of the pedal lever 50 has effected engagement of the brake shoes with the brake drum in the manner heretofore described, the knee roller 93 of the secondary control linkage 85 will be at or will be ready to pass the peak point 175 between the cam surfaces 106 and 107. When the knee roller 93 engages the cam surface 107, the slope of the cam surface is considerably less to give a lesser rate of mechanical movement to the control valve mechanism 80 and thereby allow a greater percentage of actuation of the master cylinder piston 12 to be effected through the mechanical linkage since at this time the knee pivot 79 of the primary linkage 65 is approaching its position of maximum mechanical advantage, to wit, the straight line position. However, at all times the power actuation obtained from the motor 135 will be just ahead of the mechanical actuation through the toggle linkage so as to provide a relatively soft pedal action with the motor 135 providing just sufficient power actuation to remove full mechanical actuation of the piston 12 from the pedal lever 50 and thereby reduce the manual effort required for operation of the brakes. Feel of brake action is obtained through the primary linkage 65 reacting against the pedal lever 50.

However, should the source of vacuum fail for any reason whatsoever, the actuation of the brakes is carried through the same mechanical variable-ratio linkage so that there is no change in the direct action of the master cylinder piston insofar as the mechanical actuation and leverage of the mechanical actuation is concerned whether power is available or is not available. This greatly increases the safety of the brake system since upon power failure there is no great change in effort required to apply the brakes, the variable-ratio linkage increasing mechanical advantage as the force for brake application increases.

When the brakes are released, the retraction spring 110 together with the pressure of the fluid in the brake system will tend to move the actuating system into the position illustrated in Fig. 1. When this occurs the body 91 of the valve mechanism will move upwardly relative to the plunger 75 and thereby cause the collar 127 to engage the valve 125 and lift it from the seat ring 121 so that atmospheric air can enter the vacuum chamber 143 of the pressure differential motor 135 through the port 136 adjacent the valve 125, the atmospheric air passing through the conduit 124 into the vacuum chamber 143. Since the pressure on both sides of the piston 142 will now be the same, the piston will be moved in a leftward direction through the actuating connection 149 concurrently with return of the toggle linkage to the position illustrated in Figure 1.

The differential fluid pressure motor 135 is susceptible to varying differential of pressures on opposite sides of the piston 142 depending upon atmospheric pressure and the degree of vacuum created in the engine manifold 130. Under sea level conditions the atmospheric pressure is one value and a relatively predetermined value of vacuum can be determined to be normally established in the manifold 130 under normal engine operating conditions. However, since automotive vehicles are also capable of operating under high altitude conditions, obviously the atmospheric pressure present in the atmospheric chamber 144 of the motor 135 will vary depending upon the altitude above sea level. Also, as the engine operates under high altitude conditions, the value of the vacuum in the engine manifold 130 increases and can reach a relatively high degree of vacuum under high altitude conditions. Obviously the power effect of the pressure differential motor 135 will therefore vary considerably from conditions of sea level to high altitude. Thus the spring 158 is provided between the piston 142 of the motor 135 and the shoulder 153 of the actuating rod 147 so that under conditions of high vacuum in the vacuum chamber 143 of the pressure differential motor the piston 142 can move relatively to the rod 147 with the sleeve flange 156 engaging the shoulder 153 on the rod 147, the spring 158 being placed under compression due to the relative movement between the piston 142 and the rod 147. Under these conditions a relatively constant pressure value is effected on the operating rod 147 so that the power effort of the pressure differential motor 135 will be relatively constant in its action on the master cylinder piston 12 so that a proper balance can be arranged between the power operation of the piston 12 and the mechanical operation thereof through the toggle linkages 65 and 85.

While the form of embodiment of the invention as herein disclosed constitutes a preferred form, it is to be understood that other forms might be adopted as may come within the scope of the claims which follow.

What is claimed is as follows:

1. Actuating mechanism for a vehicle brake, comprising, a cylinder with a reciprocable piston therein to effect transfer of hydraulic fluid to hydraulically actuated brakes of a vehicle, a manually operated lever, a mechanical ratio increasing linkage system connecting said lever with said piston actuable to effect variable rate movement of the piston through said mechanical linkage in a direction to produce said transfer of fluid, a differential fluid pressure motor having a pressure movable unit therein mechanically connected with said piston to actuate the same in said direction upon the establishment of said differential fluid pressure, and a control valve mechanism in said linkage system actuated substantially concurrently therewith and establishing thereby said pressure differential operation of said motor to supplement said mechanically effected movement of said piston.

2. Actuating mechanism for a vehicle brake, comprising, a cylinder with a reciprocable piston therein to effect transfer of hydraulic fluid to hydraulically actuated brakes of a vehicle, a manually operated lever, a mechanical ratio increasing linkage system connecting said lever with said piston actuable to actuate the same at a continuously varying rate in a direction to produce said transfer of fluid, a differential fluid pressure motor having a pressure movable unit therein mechanically connected with said piston to actuate the same in said direction upon the establishment of said differential fluid pressure, and a control valve mechanism incorporated into one of the links of said linkage system and actuated substantially concurrently therewith and establishing thereby pressure differential operation of said motor to supplement movement of the piston effected by said linkage system.

3. Actuating mechanism for a vehicle brake, comprising, a cylinder with a reciprocable piston therein to effect transfer of hydraulic fluid to hydraulically actuated brakes of a vehicle, a manually operated lever, mechanical ratio increasing means providing a variable ratio linkage between said lever and said piston comprising a primary actuating linkage connecting said lever with said piston to actuate the same on movement of said lever in a direction to produce said transfer of fluid and a secondary control linkage connecting said lever with said primary linkage and actuated by said lever to effect variable rate movement of said piston in response to movement of said lever, a differential fluid pressure motor having a pressure movable unit therein connected with said piston to actuate the same in said direction upon the establishment of said differential fluid pressure, and a control valve mechanism in said secondary linkage actuated substantially concurrently therewith and controlling fluid flow to said motor and thereby pressure differential operation of said motor.

4. Actuating mechanism for a vehicle brake, comprising, a cylinder with a reciprocable piston therein to effect transfer of hydraulic fluid to hydraulically actuated brakes of a vehicle, a manually operated lever, mechanical ratio increasing means providing a variable ratio linkage between said lever and said piston comprising a primary actuating toggle linkage connecting said lever with said piston to actuate the same in a direction to produce said transfer of fluid and having a pivot knee between opposite ends of the said linkage, and a secondary control toggle linkage connecting said lever with the pivot knee of said primary linkage to effect variable rate movement of said piston in response to movement of said lever, a differential fluid pressure motor having a pressure movable unit therein connected with said piston to actuate the same in said direction upon the establishment of said differential fluid pressure, and a control valve mechanism forming one of the links of said secondary linkage actuated substantially concurrently therewith and controlling fluid flow to said motor and thereby pressure differential operation of said motor.

5. Actuating mechanism for a vehicle brake, comprising, a cylinder with a reciprocable piston therein to effect transfer of hydraulic fluid to hydraulically actuated brakes of a vehicle, a manually operated lever, a toggle mechanical linkage system connecting said lever with said piston to effect movement of the piston through said mechanical linkage in a direction to produce said transfer of fluid, a differential fluid pressure motor having a pressure movable unit therein connected with said piston to actuate the same in said direction upon the establishment of said differential fluid pressure, cam means adjacent said linkage system, and a control valve mechanism in said linkage system engaging said cam means and actuated thereby upon movement of the control valve mechanism relative to said cam means substantially concurrently with actuation of said linkage system to thereby effect pressure differential operation of said motor in response to movement of the said linkage system.

6. Actuating mechanism for a vehicle brake, comprising, a cylinder with a reciprocable piston therein to effect transfer of hydraulic fluid to hydraulically actuated brakes of a vehicle, a manually operated lever, mechanical ratio increasing means providing a variable ratio linkage between said lever and said piston comprising a primary actuating toggle linkage connecting said lever with said piston to actuate the same in a direction to produce said transfer of fluid, and a secondary control toggle linkage connecting said lever with said primary linkage to effect variable rate movement of said piston in response to movement of said lever, a differential fluid pressure motor having a pressure movable unit therein connected with said piston to actuate the same in said direction upon the establishment of said differential fluid pressure, cam means adjacent said secondary control linkage, and a control valve mechanism incorporated into one of the links of said secondary linkage and engaging said cam means to effect operation of said valve mechanism and thereby controlled pressure differential actuation of said motor in response to movement of said secondary linkage.

7. Actuating mechanism for a vehicle brake, comprising, a cylinder with a reciprocable piston therein to effect transfer of hydraulic fluid to hydraulically actuated brakes of a vehicle, a manually operated lever, a variable-ratio linkage system connecting said lever with said piston to effect movement of the piston through said linkage system in a direction to produce said transfer of fluid, a differential fluid pressure motor having a pressure movable unit therein connected with said piston to actuate the same in said direction upon the establishment of said differential fluid pressure, a control valve mechanism in said linkage system actuated substantially concurrently therewith and establishing thereby pressure differential operation of said motor to supplement mechanically effected movement of said piston, and valve actuating means operably engaging the valve mechanism to operate the same to effect one rate of motor operation during initial brake application movement of said linkage system and a different rate of motor operation thereafter during the remaining portion of the brake application.

8. Actuating mechanism for a vehicle brake, comprising, a cylinder with a reciprocable piston therein to effect transfer of hydraulic fluid to hydraulically actuated brakes of a vehicle, a manually operated lever, a variable-ratio linkage system connecting said lever with said piston to effect movement of the piston through said linkage system in a direction to produce said transfer of fluid, a differential fluid pressure motor having a pressure movable unit therein connected with said piston to actuate the same in said direction upon the establishment of said differential fluid pressure, a control valve mechanism in said linkage system actuated substantially concurrently therewith and establishing thereby pressure differential operation of said motor to supplement mechanically effected movement of said piston, and valve actuating means operably engaging the valve mechanism to operate the same to effect one rate of motor operation during initial brake application movement of said linkage system and a lesser rate of motor operation thereafter during the remaining portion of the brake application.

9. Actuating mechanism for a vehicle brake, comprising, a cylinder with a reciprocable piston therein to effect transfer of hydraulic fluid to hydraulically actuated brakes of a vehicle, a manually operated lever, a variable-ratio linkage system connecting said lever with said piston to actuate the same with increasing mechanical advantage during actuation in a direction to produce said transfer of fluid, a differential fluid pressure motor having a pressure movable unit therein connected with said piston to actuate the same in said direction upon the establishment of said differential fluid pressure, and a control valve mechanism incorporated into one of the links of said linkage system actuated substantially concurrently therewith and establishing thereby pressure differential operation of said motor to effect power movement of the piston during initial brake application at a greater rate than that effected by said linkage system alone to effect thereby power take up of slack in the vehicle brake system.

10. Actuating mechanism for a vehicle brake, comprising, a cylinder with a reciprocable piston therein to effect transfer of hydraulic fluid to hydraulically actuated brakes of a vehicle, a manually operated lever, mechanical ratio increasing means providing a variable ratio linkage between said lever and said piston comprising a primary actuating toggle linkage connecting said lever with said piston to actuate the same in a direction to produce said transfer of fluid and having a pivot knee between opposite ends of the said linkage, and a secondary control toggle linkage connecting said lever with the pivot knee of said primary linkage to effect variable rate movement of said piston in response to movement of said lever, a differential fluid pressure motor having a pressure movable unit therein connected with said piston to actuate the same in said direction upon the establishment of said differential fluid pressure, a control valve mechanism in one of the links of said secondary linkage actuated substantially concurrently therewith and establishing thereby pressure differential operation of said motor, and valve actuating means operably engaging the valve mechanism to operate the same on movement of said control linkage by said lever to effect concurrently mechanical actuation of said primary linkage and controlled pressure differential operation of said motor.

11. Actuating mechanism for a vehicle brake, comprising, a cylinder with a reciprocable piston therein to effect transfer of hydraulic fluid to hydraulically actuated brakes of a vehicle, a manually operated T lever, means pivotally supporting the T lever between opposite ends of the head of the T lever, mechanical ratio increasing means providing a variable ratio linkage between said lever and said piston comprising a primary actuating toggle linkage connecting one end of the head of said lever with said piston to actuate the same in a direction to produce said transfer of fluid and having a pivot knee between opposite ends of the linkage, and a secondary control toggle linkage connecting the opposite end of the head of said lever with the pivot knee of said primary linkage to effect variable rate movement of said piston in response to movement of said lever about its pivot, a differential fluid pressure motor having a pressure movable unit therein connected with said piston to actuate the same in said direction upon the establishment of said differential fluid pressure, and a control valve mechanism forming one of the links of said secondary linkage and actuated substantially concurrently with movement of said linkage to effect thereby controlled pressure differential operation of said motor in response to movement of said control linkage.

12. Actuating mechanism for a vehicle brake, comprising, a cylinder with a reciprocable piston therein to effect transfer of hydraulic fluid to hydraulically actuated brakes of a vehicle, a manually operated T lever, means pivotally mounting the T lever between opposite ends of the head, mechanical ratio increasing means providing a variable ratio linkage between said lever and said piston comprising a primary actuating toggle linkage connecting one end of the head of said lever with said piston to actuate the same in a direction to produce said transfer of fluid and having a pivot knee between opposite ends of the linkage to provide for movement of the primary linkage from a relaxed position with the links thereof angularly related toward a straight line position of the links, and a secondary control toggle linkage connecting the opposite end of the head of said lever with the pivot knee of said primary linkage and movable from a relaxed position with the links angularly related toward a straight line position of the links whereby to actuate the primary linkage toward its straight line position, a differential fluid pressure motor having a pressure movable unit therein connected with said piston to actuate the same in said direction upon the establishment of said differential fluid pressure, and a control valve mechanism forming one of the links of said control linkage actuated substantially concurrently with movement of the control linkage toward its straight line position to effect thereby concurrent pressure differential operation of said motor.

13. Actuating mechanism for a vehicle brake, comprising, a cylinder with a reciprocable piston therein to effect transfer of hydraulic fluid to hydraulically actuated brakes of a vehicle, a manually operated T lever, means pivotally mounting the T lever between opposite ends of the head, mechanical ratio increasing means providing a variable ratio linkage system between said lever and said piston comprising a primary actuating toggle linkage connecting one end of the head of said lever with said piston to actuate the same in a direction to produce said transfer of fluid and having a pivot knee between opposite ends of the linkage to provide for movement of the primary linkage from a relaxed position with the links thereof angularly related toward a straight line position of the links, and a secondary control toggle linkage connecting the opposite end of the head of said lever with the pivot knee of said primary linkage and having a pivot knee to provide for movement of the links of said control linkage from a relaxed position with the links angularly related toward a straight line position of the links whereby to actuate the primary linkage toward its straight line position, cam means engaged by the pivot knee of said control linkage to effect movement of the control linkage toward its straight line position on movement of said lever, a differential fluid pressure motor having a pressure movable unit therein connected with said piston to actuate the same in said direction upon the establishment of said differential fluid pressure, and a control valve mechanism forming one of the links of said control linkage actuated substantially concurrently with movement of the control linkage toward its straight line position to effect thereby concurrent pressure differential operation of said motor.

14. Apparatus in accordance with claim 13 in which said cam means has one cam surface engaged by the knee of said control linkage to effect operation of said control valve mechanism and cause thereby one rate of movement of said motor during initial brake application by said lever, and a second cam surface engaged by the knee of said control linkage to cause operation of said valve mechanism to effect a different rate of movement of said motor during the remaining portion of the brake application by said lever.

15. Actuating mechanism for a vehicle brake, comprising, a cylinder with a reciprocable piston therein to effect transfer of hydraulic fluid to hydraulically actuated brakes of a vehicle, a manually operated lever, a variable-ratio system connecting said lever with said piston to actuate the same, a differential fluid pressure motor having a pressure movable unit therein, a member connecting said movable unit with said piston to actuate the same in a direction to produce said transfer of fluid including spring loading means between said unit and said member providing relatively constant pressure loading on said member for actuation of said piston irrespective of varying pressure differential on said unit, and a control valve mechanism in said linkage system actuated substantially concurrently therewith to effect pressure differential operation of said motor.

16. Actuating mechanism for a vehicle brake, comprising, a cylinder with a reciprocable piston therein to effect transfer of hydraulic fluid to hydraulically actuated brakes of a vehicle, a manually operated lever, a variable-ratio system connecting said lever with said piston to actuate the same in a direction to produce said transfer of fluid, a differential fluid pressure motor having a pressure movable unit therein, a member connecting said movable unit with said piston to actuate the same in said direction upon the establishment of said differential fluid pressure and on which said unit is disposed slidably and including resilient means between said unit and said member providing for relative movement therebetween and relatively constant pressure loading on said member for actuation of said piston irrespective of varying pressure differential on said unit, and control valve mechanism in said linkage system actuated substantially concurrently therewith to effect pressure differential operation of said motor.

References Cited in the file of this patent
UNITED STATES PATENTS

| | | |
|---|---|---|
| 1,953,057 | Sorensen | Mar. 27, 1934 |
| 1,958,511 | Dodge | May 15, 1934 |
| 2,037,869 | Wall | Apr. 21, 1936 |
| 2,265,546 | Price | Dec. 9, 1941 |
| 2,365,960 | Ingres | Dec. 26, 1944 |
| 2,706,020 | Freers et al. | Apr. 12, 1955 |